(12) United States Patent
Clayton et al.

(10) Patent No.: US 8,768,143 B2
(45) Date of Patent: Jul. 1, 2014

(54) HANDLING OF RECORDING CLASHES WHICH ARE NOT KNOWN WHEN USER CREATES RECORDING REQUEST

(75) Inventors: Mark Clayton, Bingley (GB); Jayson Turner, Manchester (GB); Luke A. Burrows, Bingley (GB)

(73) Assignee: Eldon Technology Limited, Keighley (GB)

( * ) Notice: Subject to any disclaimer, the term of this patent is extended or adjusted under 35 U.S.C. 154(b) by 719 days.

(21) Appl. No.: 12/242,422

(22) Filed: Sep. 30, 2008

(65) Prior Publication Data

US 2010/0080530 A1 Apr. 1, 2010

(51) Int. Cl.
*H04N 9/80* (2006.01)
(52) U.S. Cl.
USPC .......... 386/239; 725/37; 725/38; 725/39; 725/55; 725/56; 725/57; 725/58; 725/59; 725/60; 725/61
(58) Field of Classification Search
USPC .................................................. 725/37–61
See application file for complete search history.

(56) References Cited

U.S. PATENT DOCUMENTS

| | | | |
|---|---|---|---|
| 6,177,931 B1 | 1/2001 | Alexander et al. | |
| 6,344,878 B1 | 2/2002 | Emura | |
| 7,003,791 B2 * | 2/2006 | Mizutani | 725/21 |
| 8,272,015 B2 * | 9/2012 | Schwesinger et al. | 725/58 |
| 2003/0235393 A1 * | 12/2003 | Boston et al. | 386/46 |
| 2006/0037047 A1 | 2/2006 | Deyonker | |
| 2006/0259926 A1 * | 11/2006 | Scheelke et al. | 725/48 |
| 2007/0230903 A1 * | 10/2007 | Sakatani et al. | 386/92 |

FOREIGN PATENT DOCUMENTS

| EP | 1187467 A2 | 3/2002 |
|---|---|---|
| WO | WO 2005/002214 A1 | 1/2005 |

OTHER PUBLICATIONS

International Search Report and Written Opinion dated Dec. 1, 2009, PCT/EP2009/061501, 13 pages.
Intellectual Property Office "Office Action" mailed Oct. 25, 2012 for Taiwan Patent Appln. No. 098127905.
Intellectual Property Office "Office Action" for Taiwan Patent Application No. 098127905 mailed Mar. 11, 2013.

* cited by examiner

*Primary Examiner* — Ghazal Shehni
(74) *Attorney, Agent, or Firm* — Ingrassia Fisher & Lorenz, P.C.

(57) ABSTRACT

A programming recorder receives information after receiving at least two programming event recording requests, detects a conflict between the programming event recording requests based on the received information, creates a ranked list of alternative sources for the programming event recording requests, and resolves the conflict by fulfilling at least one of the at least two programming event recording requests utilizing an alternative source. The alternative source may be automatically selected or selected by a user. The ranked list of alternative sources may be ordered utilizing a set of one or more priority criteria. The programming event recording requests and/or the received programming information may include metadata and determining alternative sources may comprise comparing the metadata. The programming recorder may display an indication that the conflict between the at least two programming event recording requests was detected and resolved.

16 Claims, 5 Drawing Sheets

| CHANNEL | 9:00 | 9:30 | 10:00 | 10:30 |
|---------|------|------|-------|-------|
| 23 | PROGRAM A | | | PROGRAM A |
| 24 | PROGRAM B | | | |
| 25 | | | | |
| 26 | | | | |
| 27 | | | | |

HANDLING OF RECORDING CLASHES WHICH ARE NOT KNOWN WHEN USER CREATES RECORDING REQUEST

FIELD OF THE INVENTION

This invention relates generally to program recording, and more specifically to handling of recording clashes which are not known when a user creates a recording request.

BACKGROUND

Programming recorders, such as digital video recorders (DVR) or personal video recorders (PVR), may be devices that receive programming events via one or more communication paths and record the programming events to a storage medium. Programming recorders may include, but are not limited to set-top boxes, portable media players, and/or software for personal computers. Programming recorders may be incorporated into other devices including, but not limited to, communications receivers (such as satellite and/or cable receivers) and/or display devices (such as televisions). Programming recorders may be operable to receive programming requests from a user and fulfill those programming requests by receiving the programming event and recording the received programming event to the storage medium.

SUMMARY

A system for handling recording conflicts which are not known at the time a user creates a programming event recording request may include programming recorder, one or more programming event providers, and one or more communication paths communicably coupled to the programming recorder and the one or more programming event providers. The programming recorder may receive information regarding programming events after receiving at least two programming event recording requests, the at least two programming event recording requests each including a programming event to record via a communication path. The programming recorder may detect a conflict between the at least two programming event recording requests based on the received information. Detecting a conflict between the at least two programming event recording requests based on the received information may include determining that the at least two programming event recording requests overlap in time on the same communication path, the at least two programming event recording requests overlap in time and cannot be recorded at the same time, and/or the at least two programming event recording requests overlap in time and cannot be processed at the same time. The programming recorder may create a ranked list of alternative sources for a first programming event recording request of the at least two programming event recording requests. Creating a ranked list of alternative sources for a first programming event recording request of the at least two programming event recording requests may comprise determining alternative sources for the first programming event utilizing available programming event information. Creating a ranked list of alternative sources for a first programming event recording request of the at least two programming event recording requests may comprise determining alternative sources for the first programming event by analyzing received programming event information. The alternative sources may comprise an alternative time to record the programming event via the communication path and/or an alternative communication path to record the programming event. The programming recorder may resolve the conflict by fulfilling at least one of the at least two programming event recording requests utilizing an alternative source.

Resolving the conflict by fulfilling at least one of the at least two programming event recording requests utilizing an alternative source may comprise automatically selecting the top ranked alternative source from the ranked list of alternative sources. Alternatively, the programming recorder may display the ranked list of alternative sources utilizing the user interface and may receive a selection from the ranked list of alternative sources via the user interface. The programming recorder may then resolve the conflict by fulfilling at least one of the at least two programming event recording requests utilizing the selected alternative source.

Creating a ranked list of alternative sources may include ordering the ranked list of alternative sources by a set of one or more priority criteria. The programming recorder may order the ranked list by a set of one or more priority criteria obtained from a user via the user interface. The programming recorder may order the ranked list by a set of one or more priority criteria obtained from the one or more programming event providers. The programming recorder may order the ranked list by a set of one or more priority criteria that has been pre-installed in the programming recorder. The set of one or more priority criteria may include directions for ordering the ranked list according to any number of characteristics such as prioritizing alternative recording times over alternative communication paths, prioritizing alternative communication paths over alternative recording times, prioritizing a type of communication path over another type of communication path, prioritizing a programming event provider that charges an access fee for access to a programming event, prioritizing a programming event provider that does not charge an access fee for access to a programming event, prioritizing a programming event provider that does not charge an access fee for access to a programming event over a programming event provider that charges an access fee for access to a programming event, and/or prioritizing alternative sources differently based on a classification of a programming event.

The at least two programming event recording requests may include metadata (e.g. data about data). The metadata included in the at least two programming event recording requests may be captured from programming event information at the time each of the at least two programming event recording requests are made. The metadata included in the at least two programming event recording requests may include information identifying one or more programming events requested for recordation by the at least two programming event recording requests. The received programming information may also include metadata. The metadata included in the received programming information may include information identifying one or more programming events the programming information includes information concerning. The metadata included in at least two programming event recording requests and/or the metadata included in the programming information may include one or more content reference identifiers. A content reference identifier may include information identifying one or more programming events arranged in a sequence of fields, such as series/program/episode. A content reference identifier may include a uniform resource locator. The uniform resource locator may identify a location of information related to one or more programming events including, but not limited to, information identifying the one or more programming events, a download location for the one or more programming events, information identifying the originator of the one or more programming events, information identifying the originator of the content reference identifier, a location of the originator of the content reference identifier, and/or a location of the originator of the one or more programming events.

Determining alternative sources for the first programming event by analyzing received programming event information may comprise comparing the metadata included in at least one of the at least two programming event recording requests with the metadata included in the programming information. The metadata included in at least one of the at least two programming event recording requests and/or the metadata included in the programming information may include abbreviations. The abbreviations in the metadata included in at least one of the at least two programming event recording requests and/or the metadata included in the programming information may be abbreviated according to differing conventions. As such, comparing the metadata included in at least one of the at least two programming event recording requests with the metadata included in the programming information may comprise expanding abbreviations included in the metadata included in at least one of the at least two programming event recording requests and/or the metadata included in the programming information.

In alternative embodiments, the programming recorder may determine no alternative sources exist for the first programming event recording request of the at least two programming event recording requests (which the programming recorder may determine that the ranked list of alternative sources for a first programming event recording request is empty). The programming recorder may then create a ranked list of alternative sources for a second programming event recording request of the at least two programming event recording requests and resolve the conflict utilizing an alternative source from the ranked list of alternative sources for a second programming event recording request. In other alternative embodiments, creating a ranked list of alternative sources may comprise creating a ranked list of alternative sources for more than one of the at least two programming event recording requests. Creating a ranked list of alternative sources for more than one of the at least two programming event recording requests may comprise generating a single ranked list of alternative sources for the at least two programming event recording requests based on a set of one or more priority criteria and fulfilling at least one of the at least two programming event recording requests utilizing an alternative source may utilize the single ranked list of alternative sources for the at least two programming event recording requests. Alternatively, creating a ranked list of alternative sources for more than one of the at least two programming event recording requests may comprise generating separate ranked lists of alternative sources for each of the at least two programming event recording requests based on a set of one or more priority criteria and fulfilling at least one of the at least two programming event recording requests utilizing an alternative source may utilize the separate ranked lists of alternative sources based on a set of one or more priority criteria. In still other alternative embodiments, the programming recorder may display an indication that the conflict between the at least two programming event recording requests was detected and resolved via the user interface.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION OF THE EMBODIMENTS

The description that follows includes exemplary systems, methods, techniques, instruction sequences, and/or computer program products that embody techniques of the present disclosure. However, it is understood that the described disclosure may be practiced without these specific details. Reference will now be made in detail to the subject matter disclosed, which is illustrated in the accompanying drawings.

A programming recorder may be capable of recording a finite number of programming events at a particular time. For example, a programming recorder may include a single satellite communication path and may be capable of receiving a single programming event from the satellite communication path at a given time. If a user requests recordation of two simultaneous and/or overlapping programming events a conflict may occur. The programming recorder may be unable to fulfill both requests and may display an error message. By way of another example, a programming recorder may include a single cable communication path and may be capable of receiving two programming events from the cable communication path at a given time (or the programming recorder may include a satellite communication path and a cable communication path and the programming recorder may be capable of receiving one programming event from each of the satellite communication path and the cable communication path at a given time). If a user requests recordation of three simultaneous and/or overlapping programming events a conflict may occur. The programming recorder may be unable to fulfill both requests and may display an error message. By way of still another example, a programming recorder may be capable of transferring ten programming events to a storage medium for recording concurrently. If a user requests recordation of eleven simultaneous and/or overlapping programming events a conflict may occur. The programming recorder may be unable to transfer all eleven programming events to the storage medium for recordation at the same time and may display an error message. By way of yet another example, a programming recorder may be capable of processing fifteen programming events simultaneously. If a user requests recordation of sixteen simultaneous and/or overlapping programming events a conflict may occur. The programming recorder may be unable to process receiving and recording all sixteen programming events at the same time and may display an error message.

A programming recorder may receive information regarding programming events. A programming recorder may receive information regarding programming events via one or more communication paths. A programming recorder may receive information regarding programming events that has been broadcast to the programming recorder. A programming recorder may receive information regarding programming events in response to a query from the programming recorder to a database. A programming recorder may receive information regarding available programming events via one or more communication paths and may present the information regarding programming events to a user. The user may utilize the presented information regarding programming events to select programming events to record and may submit programming event recording requests based upon the selected programming events. A programming recorder may analyze information that has been received regarding programming events upon receiving one or more programming event recording requests to determine whether a conflict exists.

A programming recorder may receive information regarding programming events for a period (including, but not limited to a day, a week, a month, or a year) at a first point in time. At a second point in time, the programming recorder may receive additional information regarding programming events for a second period (including, but not limited to a day, a week, a month, or a year). The additional information may comprise an update to the information obtained from the same source as the information and/or may be obtained from a different source from the information. If a user submits programming event recording requests after the first time, but prior to the second time, the programming recorder may analyze the information and not the additional information to determine whether a conflict exists among programming event recording requests. If changes are made to the programming events between the first time and the second time, the programming recorder may detect a conflict at the second time that did not exist at the first time.

By way of example, a programming recorder may receive information at a first time specifying that a particular police drama series will air every Wednesday between ten and eleven PM central standard time and a particular game show will air every Wednesday between nine-thirty and ten PM central standard time. The programming recorder may then receive programming event recording requests specifying to record every episode of the particular police drama series and every episode of the particular game show. The programming recorder may analyze the information and determine no conflict exists between the request to record every episode of the particular police drama series and the request to record every episode of the game show, as the programming events air at different times. However, the programming recorder may receive additional information at a second time specifying that the particular game show has been rescheduled to air every Wednesday between ten and ten-thirty PM central standard time. The programming recorder may analyze the information and the additional information and determine a conflict now exists between the request to record every episode of the particular police drama series and the request to record every episode of the particular game show if the programming recorder is not capable of satisfying both requests because the programming events air at overlapping times.

By way of another example, a programming recorder may receive information at a first time specifying that a particular comedy sitcom series will air weeknights between four and five PM mountain daylight time and a particular new reality television show will air at an undetermined time. The programming recorder may then receive programming event recording requests specifying to record every episode of the particular comedy sitcom series and every episode of the particular new reality television show. The programming recorder may analyze the information and determine no conflict exists between the request to record episode of the particular comedy sitcom series and every episode of the particular new reality television show, as the air time for the particular new reality television show has not yet been determined. However, the programming recorder may receive additional information at a second time specifying that the particular new reality television show has been scheduled to air every Monday between four and five PM mountain daylight time. The programming recorder may analyze the information and the additional information and determine a conflict now exists between the request to record every episode of the particular comedy sitcom series and every episode of the particular new reality television show if the programming recorder is not capable of satisfying both requests because the programming events air at the same time on Mondays.

By way of still another example, a programming recorder may receive information at a first time specifying that a particular soap episode of a particular opera will air Wednesday March 14 between nine and ten AM pacific standard time and a particular game for a particular sports team will air Saturday March 17 between five and eight PM pacific standard time. The programming recorder may then receive programming event recording requests specifying to record the particular episode of the particular soap opera and the particular game for the particular sports team. The programming recorder may analyze the information and determine no conflict exists between the particular episode of the particular soap opera and the particular game for the particular sports team. However, the programming recorder may receive additional information at a second time specifying that the particular game for the particular sports team has been moved to air on Wednesday March 14 between eight and eleven AM pacific standard time. The programming recorder may analyze the information and the additional information and determine a conflict now exists between the particular episode of the particular soap opera and the particular game for the particular sports team if the programming recorder is not capable of satisfying both requests because the programming events are both airing during the time period of nine and ten AM pacific standard time Wednesday March 14.

When a programming recorder is able determine a conflict upon receipt of programming event recording requests, the programming recorder may be operable to prevent a user from submitting conflicting programming event recording requests. The programming recorder may be operable to display messages to a user so that the user is aware they have attempted to enter conflicting requests and may modify the programming event recording requests accordingly. However, when a programming recorder determines a conflict exists between two or more previously received programming event recording requests based on the receipt of additional programming information, the programming recorder may not be able to prevent submission of the conflicting programming event recording requests as the conflicting programming event recording requests have already been submitted. To resolve the conflict, the programming recorder may simply not fulfill one or more of the conflicting programming event recording requests. However, this resolution would result in the failure to record one or more programming events a user expects to be recorded.

Figure 1:
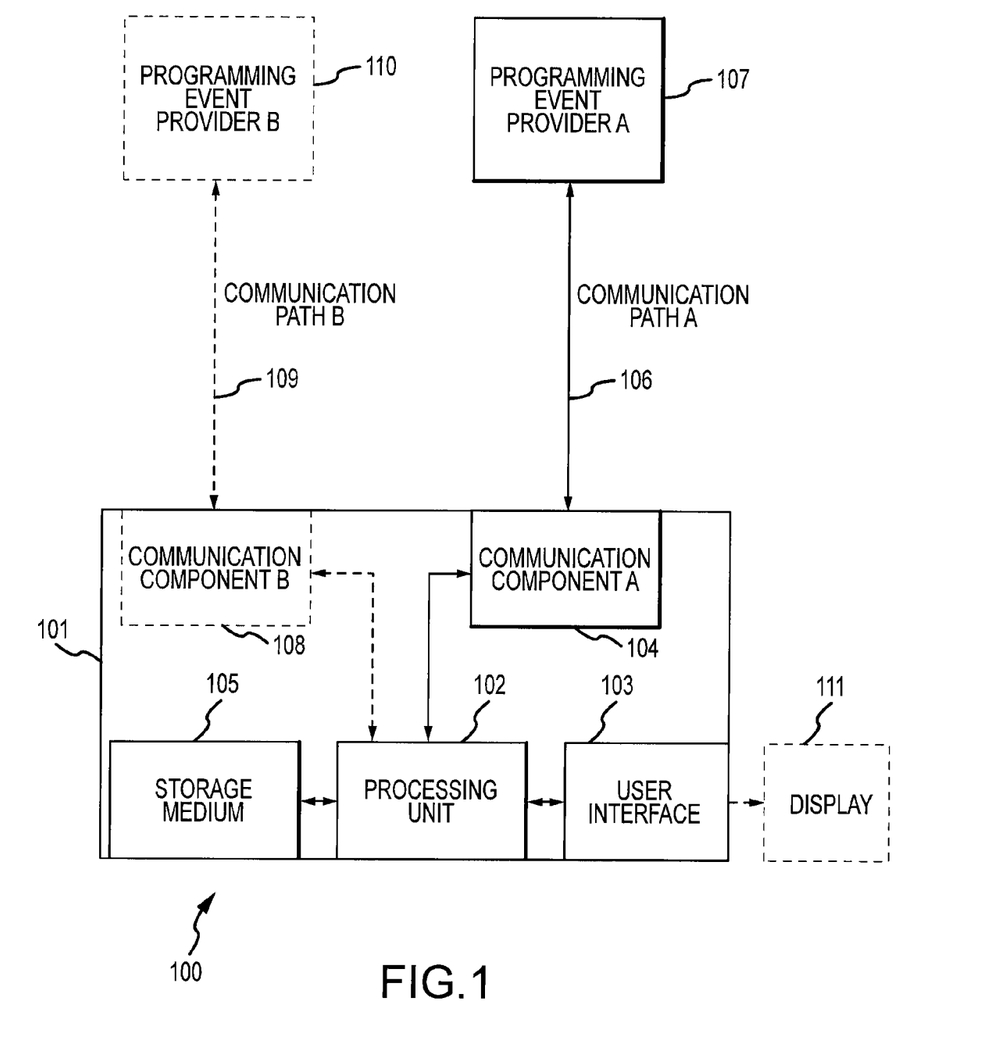
FIG. 1 is a block diagram illustrating a system 100 for handling recording conflicts which are not known at the time a user created a programming event recording request, in accordance with an embodiment of the present disclosure.

FIG. 1 is a block diagram illustrating a system 100 for handling recording conflicts which are not known at the time a user creates a programming event recording request, in accordance with an embodiment of the present disclosure. System 100 may include programming recorder 101, programming event provider A 107, and communication path A 106 communicably coupled to the programming recorder 101 and programming event provider A 107. The programming recorder 101 may include processing unit 102, user interface 103 communicatively coupled to the processing unit 102, storage medium 105 communicatively coupled to the processing unit 102, and communication component A 104 communicably connected to the processing unit 104 and communication path 106. The programming recorder 101 may also include optional communication component B 108 communicatively coupled to the processing unit 102 and communicatively coupled to programming event provider B 110 via communication path B. System 100 may optionally include display 111 communicably coupled to the user interface 103 and the processing unit 102 may be operable to render one or more programming events from the programming event provider A 107, the programming event provider B 110, and/or the storage medium 105 utilizing the display 111 via the user interface 103.

The processing unit 102 may be operable to receive one or more programming event recording requests via the user interface 103. The processing unit 102 may be operable to fulfill the one or more recording requests by obtaining one or more programming events from the programming event provider 107 (via the communication component A 104 and the communication path A 106) and/or the programming event provider 110 (via the communication component B 108 and the communication path B 109) and recording the one or more programming events to the storage medium 105. The programming recorder 101 may be capable of recording a finite number of programming events at a particular time.

The programming recorder 101 may include, but is not limited to, a digital video recorder (DVR), a personal video recorder (PVR), and/or a set-top box. The processing unit 102 may include, but is not limited to, an integrated circuit device such as a controller. The user interface 103 may include, but is not limited to, one or more buttons, a wireless signal receiver (such as an infrared signal receiver), one or more switches, a touch screen, a keyboard, a mouse, a track ball, a track pad, and/or a voice recognition receiver. The communication component 104 and/or the communication component 108 may include, but are not limited to, a tuner and/or network interface. The storage medium 105 may include, but is not limited to, a magnetic storage medium (e.g., floppy diskette and hard disk drive), an optical storage medium (e.g., CD-RW, DVD-RW, and DVD-RAM); a magneto-optical storage medium, a random access memory (RAM); an erasable programmable memory (e.g., EPROM and EEPROM); a flash memory; and/or other type of medium suitable for storing programming events in a form (e.g., software, processing application) readably by a the processing unit 102. The communication path A 106 and/or the communication path B 109 may include, but are not limited to, satellite communication paths, cable communication paths, free-to-air communication paths, terrestrial television communication paths, network communication paths, Internet communication paths, radio communication paths, and/or cellular communication paths. The programming event provider A 107 and/or the programming event provider 110 may include, but are not limited to, television broadcasters, radio broadcasters, satellite providers, cable providers, network servers, Internet file servers, streaming content providers, and/or on demand content providers. The display 111 may include a television, a cathode ray-tube display, a liquid crystal display, a light emitting diode, and/or a speaker.

The processing unit 102 may be operable to receive programming information from the programming event provider A 107 (via the communication component A 104 and the communication path A 106) and/or the programming event provider 110 (via the communication component B 108 and the communication path B 109). The processing unit 102 may be operable to receive programming information that has been broadcast by the programming event provider A 107 and/or the programming event provider B 110 and/or may receive programming event information from the programming event provider A 107 and/or the programming event provider B 110 in response to a query for programming information from processing unit 102. The programming unit 102 may be operable to query the programming event provider A 107 (via the communication component A 104 and the communication path A 106) and/or the programming event provider 110 (via the communication component B 108 and the communication path B 109) for programming information, which may include querying a programming information database of the programming event provider A 107 and/or the programming event provider 110.

Figure 2:
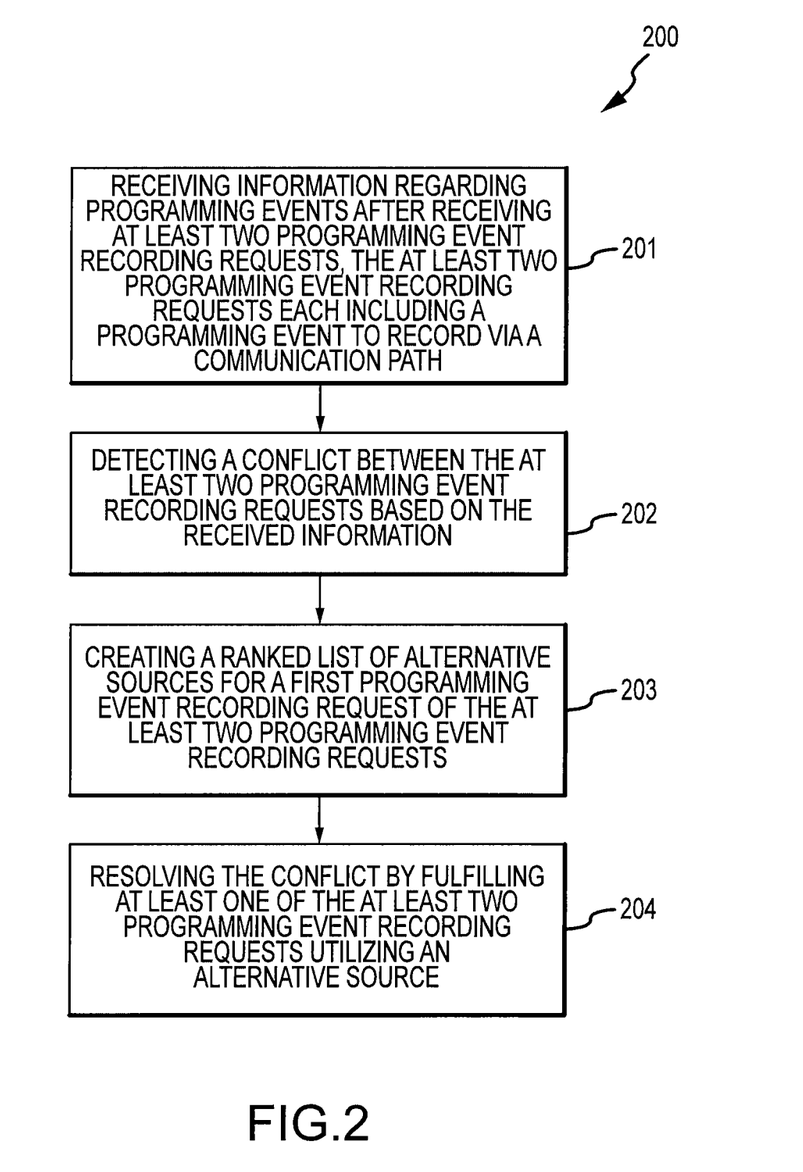
FIG. 2 is a method diagram illustrating a method 200 of handling recording conflicts which are not know at the time a user creates a programming event recording request which may be performed by the system 100 of FIG. 1.

FIG. 2 is a flow chart illustrating a method 200 of handling recording conflicts which are not known at the time a user creates a programming event recording request which may be performed by system 100. System 100 may perform the method 200 by the processing unit 102 loading and executing one or more instructions embodied in a computer-readable and/or machine-readable medium, such as the storage medium 105 and/or another storage medium. Step 201 may comprise the operation of receiving information regarding programming events after receiving at least two programming event recording requests, the at least two programming event recording requests each including a programming event to record via a communication path. Step 202 may comprise the operation of detecting a conflict between the at least two programming event recording requests based on the received information. The operation of detecting a conflict between the at least two programming event recording requests based on the received information may include determining that the at least two programming event recording requests overlap in time on the same communication path, the at least two programming event recording requests overlap in time and cannot be recorded at the same time, and/or the at least two programming event recording requests overlap in time and cannot be processed at the same time. Step 203 may comprise the operation of creating a ranked list of alternative sources for a first programming event recording request of the at least two programming event recording requests. The operation of creating a ranked list of alternative sources for a first programming event recording request of the at least two programming event recording requests may comprise determining alternative sources for the first programming event utilizing available programming event information. The operation of creating a ranked list of alternative sources for a first programming event recording request of the at least two programming event recording requests may comprise determining alternative sources for the first programming event by analyzing received programming event information. The alternative sources may comprise an alternative time to record the programming event via the communication path and/or an alternative communication path to record the programming event. Step 204 may comprise the operation of resolving the conflict by fulfilling at least one of the at least two programming event recording requests utilizing an alternative source.

Figure 3:
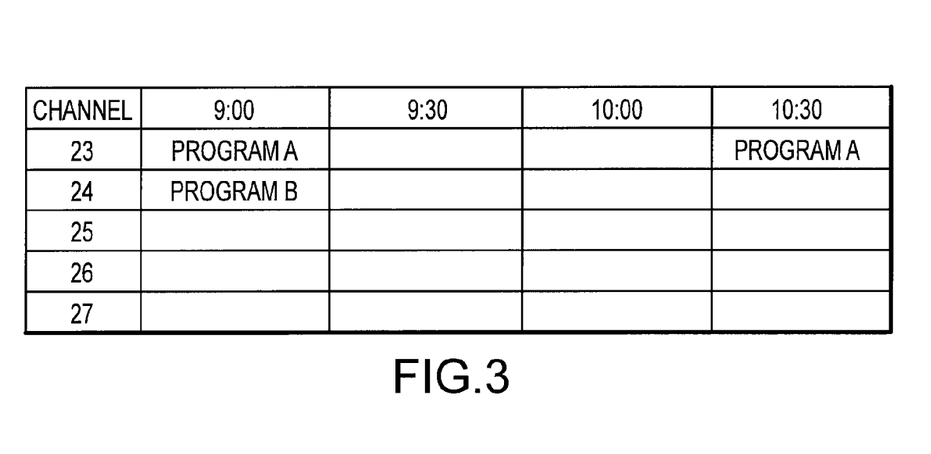
FIG. 3 is a diagram illustrating an example of programming information that may be received by the programming recorder 101 of FIG. 1.
Figure 4:
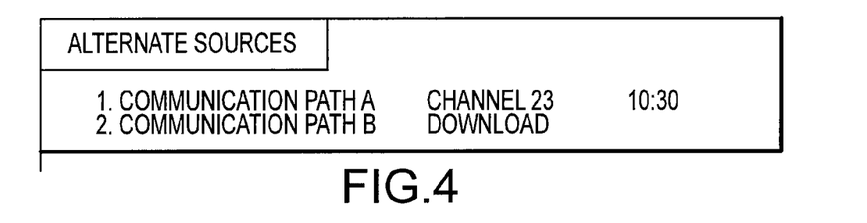
FIG. 4 is a diagram illustrating an example ranked list of alternative sources that may be created by the programming recorder 101 of FIG. 1.

By way of example, the processing unit 102 may have received programming event recording requests via the user interface 103 requesting recordation of a program a and a program b from the programming event provider A 107 which comprises a satellite programming event provider. At the time the processing unit 102 received the programming event recording requests, the processing unit 102 had received programming information from the programming event provider A 107 that program a was scheduled to air at nine AM eastern standard time at a particular date but that an air time for program b had not yet been scheduled. The processing unit 102 analyzed the received programming information and determined no conflict existed between the programming event recording requests to record program a and program b because the two programs did not have overlapping and/or conflicting air times. However, prior to the air time for program a, the processing unit receives additional programming information from the programming event provider A 107 illustrated in FIG. 3. As can be seen in FIG. 3, program b is now scheduled to air at the same time that the requested program a will air. The processing unit 102 may determine that both program a and program b cannot be recorded at the same time and that a conflict now exists. In this example, the processing unit 102 is not able to obtain both program a and program b via communication path A 106 at the same time. The processing unit 102 may then attempt to resolve the conflict. The processing unit 102 may attempt to resolve the conflict by determining alternative sources for program a. Based on the programming information that the processing unit 102 has received from the programming event provider 107, the processing unit 102 may determine (as is illustrated in FIG. 3) that program a will also air at the alternative time of ten-thirty AM eastern standard time on the same date. Further, communication path B 109 may comprise an Internet communication path and the programming event provider B 110 may comprise an Internet server that makes programming events available for download upon request. The programming event provider B 110 may charge a fee for download of one or more programming events. The processing unit 102 may query the programming event provider B 110 regarding the availability of program a and may receive information that program a is available for download from the programming event provider B 110. Based on the information received from the programming event provider A 107 and the programming event provider B 110, the processing unit 102 may create a ranked list of alternative sources for program a, illustrated in FIG. 4. In this example, the processing unit 102 creates the ranked list of alternative sources for program a based on a priority criteria that specifies to rank alternative sources that comprise alternative recording times on the requested communication path higher than alternative sources that comprise alternative communication paths, ranking the alternative source comprising the alternative time of ten thirty AM eastern standard time higher than the alternative source of downloading program a from the programming event provider B 110. The processing unit 102 may then utilize the ranked list to resolve the conflict and fulfill the programming event recording requests by obtaining program b from communication path A 106 at nine AM eastern standard time, recording the obtained program b to the storage medium 105, obtaining program a from communication path A 106 at ten thirty AM eastern standard time, and recording the obtained program a to the storage medium 105.

Although the above embodiment has been described as creating a ranked list of alternative sources for a first programming request of the at least two programming event recording requests, it should be understood that one or more ranked lists of alternative sources may be created for one or more of the at least two programming event recording requests and fulfilling at least one of the at least two programming event recording requests utilizing an alternative source may utilize the one or more ranked lists of alternative sources without departing from the present disclosure. For example, a single ranked list of alternative sources for the at least two programming event recording requests may be created based on a set of one or more priority criteria. The single ranked list of alternative sources for the at least two programming event recording requests may be utilized in fulfilling at least one of the at least two programming event recording requests utilizing an alternative source. By way of another example, separate ranked lists of alternative sources for each of the at least two programming event recording requests may be created based on a set of one or more priority criteria. The separate lists may be utilized in fulfilling at least one of the at least two programming event recording requests utilizing an alternative source and/or the separate lists may be combined prior to utilization in fulfilling at least one of the at least two programming event recording requests utilizing an alternative source.

As in the above example, the operation of resolving the conflict by fulfilling at least one of the at least two programming event recording requests utilizing an alternative source may comprise automatically selecting the top ranked alternative source from the ranked list of alternative sources. In alternative embodiments, the processing unit 102 may display the ranked list of alternative sources utilizing the user interface 103 and may receive a selection from the ranked list of alternative sources via the user interface 103. The processing unit 102 may then resolve the conflict by fulfilling at least one of the at least two programming event recording requests utilizing the selected alternative source.

The operation of creating a ranked list of alternative sources may include ordering the ranked list of alternative sources by a set of one or more priority criteria. The processing unit 102 may order the ranked list by a set of one or more priority criteria obtained from a user via the user interface 103. The processing unit 102 may order the ranked list by a set of one or more priority criteria obtained from the programming event provider A 107 and/or the programming event provider B 110. The processing unit 102 may order the ranked list by a set of one or more priority criteria that have been pre-installed in the storage medium 105 and/or another storage medium. The set of one or more priority criteria may include directions for ordering the ranked list according to any number of characteristics. For example, the set of one or more priority criteria may specify to rank alternative sources that comprise alternative recording times on the requested communication path higher than alternative sources that comprise alternative communication paths or to rank alternative sources that comprise alternative communication paths higher than alternative sources that comprise alternative recording times on the requested communication path. By way of another example, the set of one or more criteria may specify to rank alternative sources that comprise a type of communication path (such as an Internet communication path) higher than alternative sources that comprise another type of communication path (such as a terrestrial television communication path). By way of still another example, the set of one or more criteria may specify to rank alternative sources that comprise a programming event provider that charges an access fee for access to a programming event lower than alternative sources that comprise a programming event provider that does not charge an access fee for access to a programming event or to rank alternative sources that comprise a programming event provider that does not charge an access fee for access to a programming event lower than alternative sources that comprise a programming event provider that charges an access fee for access to a programming event. By way of yet another example, the set of one or more criteria may specify to rank alternative sources differently based on a classification of a programming event, such as ranking alternative sources that comprise alternative recording times on the requested communication path higher than alternative sources that comprise alternative communication paths for a programming event that is classified as an daytime programming event or ranking alternative sources that comprise alternative communication paths higher than alternative sources that comprise alternative recording times on the requested communication path for a programming event that is classified as a primetime programming event.

The at least two programming event recording requests may include metadata (e.g. data about data). The metadata included in the at least two programming event recording requests may be captured from programming event information at the time each of the at least two programming event recording requests are made. The metadata included in the at least two programming event recording requests may include information identifying one or more programming events requested for recordation by the at least two programming event recording requests. The received programming information may also include metadata. The metadata included in the received programming information may include information identifying one or more programming events the programming information includes information concerning. The metadata included in the at least two programming event recording requests and/or the metadata included in the programming information may include one or more content reference identifiers (such as the content reference identifier set forth in the TV-Anytime specifications accessible at www.tv-anytime.org, which are herein incorporated by reference). A content reference identifier may include information identifying one or more programming events arranged in a sequence of fields, such as series/program/episode. A content reference identifier may include a uniform resource locator. The uniform resource locator may identify a location of information related to one or more programming events including, but not limited to, information identifying the one or more programming events, a download location for the one or more programming events, information identifying the originator of the one or more programming events, information identifying the originator of the content reference identifier, a location of the originator of the content reference identifier, and/or a location of the originator of the one or more programming events.

Determining alternative sources for the first programming event by analyzing received programming event information may comprise comparing the metadata included in at least one of the at least two programming event recording requests with the metadata included in the programming information. The metadata included in at least one of the at least two programming event recording requests and/or the metadata included in the programming information may include abbreviations. The abbreviations in the metadata included in at least one of the at least two programming event recording requests and/or the metadata included in the programming information may be abbreviated according to differing conventions. As such, comparing the metadata included in at least one of the at least two programming event recording requests with the metadata included in the programming information may comprise expanding abbreviations included in the metadata included in at least one of the at least two programming event recording requests and/or the metadata included in the programming information. For example, the metadata included in at least one of the at least two programming event recording requests may include the word series abbreviated as ser whereas the metadata included in the programming information may include the word series abbreviated as sr. In this example, comparing the metadata included in at least one of the at least two programming event recording requests with the metadata included in the programming information may comprise expanding the abbreviations ser and sr to series to enable comparison of the metadata included in at least one of the at least two programming event recording requests with the metadata included in the programming information. By way of another example, the metadata included in the at least one of the two programming event recording requests may include information identifying a programming event provider which provides the programming event and the metadata included in the programming information may not include information identifying the programming event provider. In this example, comparing the metadata included in at least one of the at least two programming event recording requests with the metadata included in the programming information may comprise inserting information identifying a programming event provider based on the originator of the programming information to enable comparison of the metadata included in at least one of the at least two programming event recording requests with the metadata included in the programming information.

Figure 5:
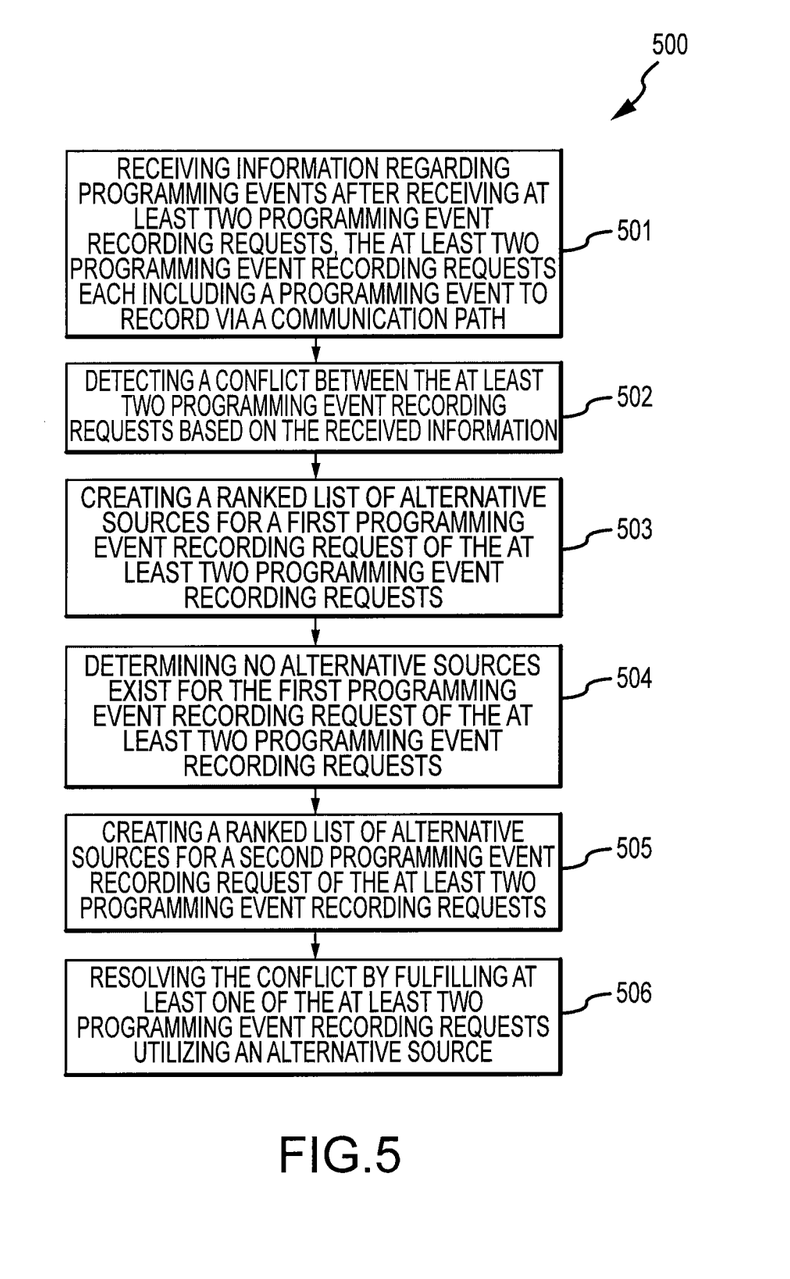
FIG. 5 is a method diagram illustrating an alternative method 500 of handling recording conflicts which are not know at the time a user creates a programming event recording request which may be performed by the system 100 of FIG. 1.

FIG. 5 is a flow chart illustrating an alternative method 500 of handling recording conflicts which are not known at the time a user creates a programming event recording request which may be performed by system 100. System 100 may perform the method 500 by the processing unit 102 loading and executing one or more instructions embodied in a computer-readable and/or machine-readable medium, such as the storage medium 105. Step 501 may comprise the operation of receiving information regarding programming events after receiving at least two programming event recording requests, the at least two programming event recording requests each including a programming event to record via a communication path. Step 502 may comprise the operation of detecting a conflict between the at least two programming event recording requests based on the received information. Step 503 may comprise the operation of creating a ranked list of alternative sources for a first programming event recording request of the at least two programming event recording requests. Step 504 may comprise the operation of determining no alternative sources exist for the first programming event recording request of the at least two programming event recording requests. The operation of determining no alternative sources exist for the first programming event recording request of the at least two programming event recording requests may comprise determining that the ranked list of alternative sources for a first programming event recording request is empty. Step 505 may comprise the operation of creating a ranked list of alternative sources for a second programming event recording request of the at least two programming event recording requests. Step 506 may comprise the operation of resolving the conflict by fulfilling at least one of the at least two programming event recording requests utilizing an alternative source.

By way of example, the processing unit 102 may have received programming event recording requests via the user interface 103 requesting recordation of a program c and a program d from the programming event provider A 107 which comprises a cable programming event provider. At the time the processing unit 102 received the programming event recording requests, the processing unit 102 had received programming information from the programming event provider A 107 that program c was scheduled to air at 9 AM pacific daylight time on a particular date and program d was scheduled to air at 10 AM pacific daylight time on the particular date. The processing unit 102 analyzed the received programming information and determined no conflict existed between the programming event recording requests to record program c and program d because the two programs did not have overlapping and/or conflicting air times. However, prior to the air time for program c, the processing unit receives additional programming information from the programming event provider A 107 indicating that program d had been rescheduled to air at 9 AM pacific daylight time on the particular date. The processing unit 102 may determine that both program c and program d cannot be recorded at the same time and that a conflict now exists. In this example, the processing unit 102 is notable to obtain both program c and program d via communication path A 106 at the same time. The processing unit 102 may then attempt to resolve the conflict. The processing unit 102 may attempt to resolve the conflict by determining alternative sources for program c. Based on the programming information that the processing unit 102 has received from the programming event provider 107, the processing unit 102 may determine that there are no alternate times for program c. Further, communication path B 109 may comprise a terrestrial television broadcast communication path and the programming event provider B 110 may comprise a terrestrial television broadcaster. The processing unit 102 may receive programming information from the programming event provider B 110. The programming information received from the programming event provider B 110 may indicate that program c is not available from the programming event provider B 110. Based on the information received from the programming event provider A 107 and the programming event provider B 110, the processing unit 102 may create a ranked list of alternative sources for program c. However, the ranked list may be empty because the processing unit 102 did not determine any alternative sources for program c. The processing unit 102 may determine there are no alternative sources for program c, because the ranked list is empty. The processing unit 102 may attempt to resolve the conflict by determining alternative sources for program d. Based on the programming information received from the programming event provider 107 and the programming event provider B 110, the processing unit 102 may determine that the programming event provider B 110 will air program D at 10 AM pacific daylight time on the particular day. Based on the information received from the programming event provider A 107 and the programming event provider B 110, the processing unit 102 may create a ranked list of alternative sources for program d. The processing unit 102 may then utilize the ranked list to resolve the conflict and fulfill the programming event recording requests by obtaining program c from communication path A 106 at 9 AM pacific daylight time, recording the obtained program c to the storage medium 105, obtaining program d from communication path B 109 at 10 AM pacific daylight time on the particular date, and recording the obtained program d to the storage medium 105.

Figure 6:
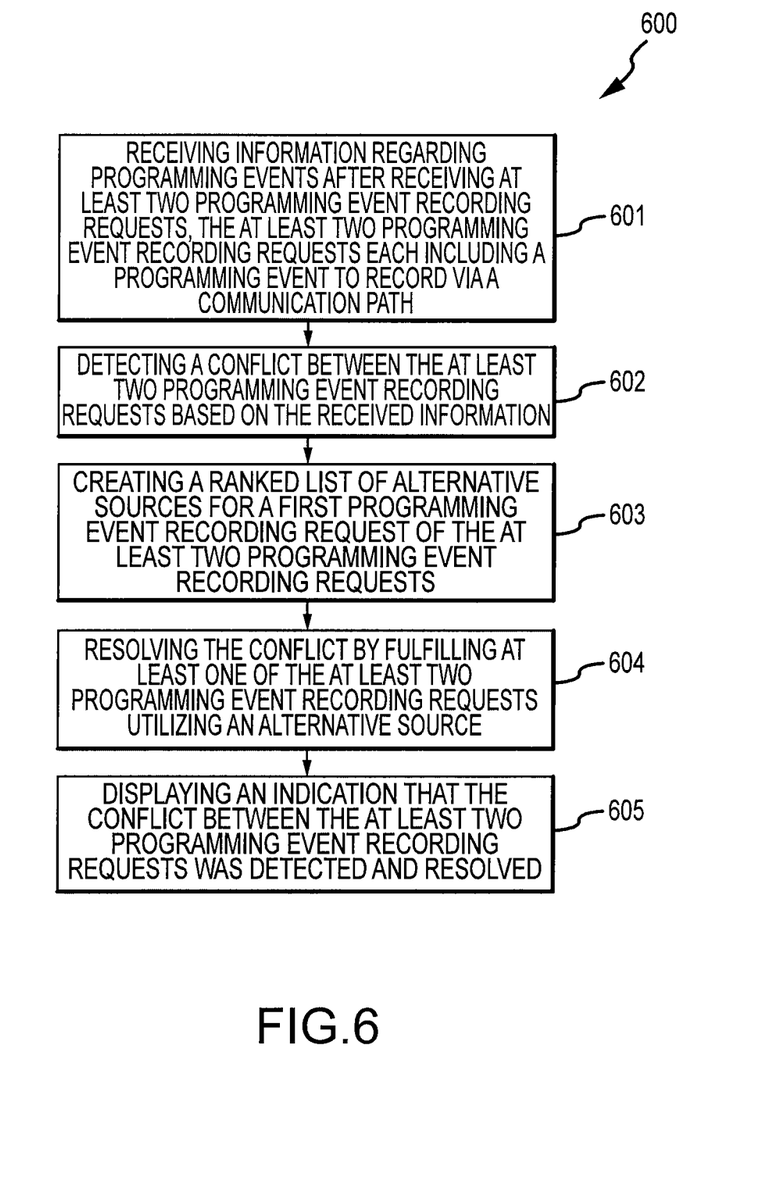
FIG. 6 is a method diagram illustrating an alternative method 600 of handling recording conflicts which are not know at the time a user creates a programming event recording request which may be performed by the system 100 of FIG. 1.

FIG. 6 is a flow chart illustrating an alternative method 600 of handling recording conflicts which are not known at the time a user creates a programming event recording request which may be performed by system 100. System 100 may perform the method 600 by the processing unit 102 loading and executing one or more instructions embodied in a computer-readable and/or machine-readable medium, such as the storage medium 105. Step 601 may comprise the operation of receiving information regarding programming events after receiving at least two programming event recording requests, the at least two programming event recording requests each including a programming event to record via a communication path. Step 602 may comprise the operation of detecting a conflict between the at least two programming event recording requests based on the received information. Step 603 may comprise the operation of creating a ranked list of alternative sources for a first programming event recording request of the at least two programming event recording requests. Step 604 may comprise the operation of resolving the conflict by fulfilling at least one of the at least two programming event recording requests utilizing an alternative source. Step 605 may comprise the operation of displaying an indication that the conflict between the at least two programming event recording requests was detected and resolved.

By way of example, the processing unit 102 may have received programming event recording requests via the user interface 103 requesting recordation of a program x and a program y from the programming event provider A 107 which comprises an Internet Protocol Television programming event provider. At the time the processing unit 102 received the programming event recording requests, the processing unit 102 had received programming information from the programming event provider A 107 that program x was scheduled to air at eight PM Alaska standard time and program y was scheduled to air at nine PM Alaska standard time. The processing unit 102 analyzed the received programming information and determined no conflict existed between the programming event recording requests to record program x and program y because the two programs did not have overlapping and/or conflicting air times. However, prior to the air time for program x (and prior to 7 AM Alaska standard time on the particular date based on the circumstances of this example), the processing unit receives additional programming information from the programming event provider A 107 that program y is now scheduled to air at an overlapping time with the requested program x. The processing unit 102 may determine that both program x and program y cannot be recorded at the same time and that a conflict now exists. In this example, the processing unit 102 is not able to obtain both program x and program y via communication path A 106 at the same time. The processing unit 102 may then attempt to resolve the conflict. The processing unit 102 may attempt to resolve the conflict by determining alternative sources for program x. Based on the programming information that the processing unit 102 has received from the programming event provider 107, the processing unit 102 may determine that program x is not available at an alternate time. Communication path B 109 may comprise a satellite communication path and the programming event provider B 110 may comprise a satellite programming event provider. The processing unit 102 may receive programming information from the programming event provider B 110 that program x is available from the programming event provider B 110 at 7 AM Alaska standard time on the particular date. Based on the information received from the programming event provider A 107 and the programming event provider B 110, the processing unit 102 may create a ranked list of alternative sources for program x. The processing unit 102 may utilize the ranked list to resolve the conflict and fulfill the programming event recording requests by obtaining program x from communication path B 110 at 7 AM Alaska standard time, recording the obtained program x to the storage medium 105, obtaining program y from communication path A 106, and recording the obtained program y to the storage medium 105. The processing unit 102 may then display an indication (utilizing the user interface 103 and the display 111) that a conflict between program x and program y was encountered and resolved by obtaining program x from communication path B 110 at 7 AM Alaska standard time.

Although the programming recorder 101 has been described as including two communication components, it is understood that a programming recorder may include any number of communication components communicably connected to any number of programming event providers via any number (and/or type) of communication paths without departing from the scope of the present disclosure. Although the present disclosure has been described as receiving two programming event recording requests, it is understood that any number of recording requests may be received without departing from the present disclosure. Although the present disclosure has been described in the context of conflicts between two programming event recording requests, it is understood that a conflict may occur between any number of recording requests without departing from the present disclosure. Although the programming recorder 101 has been described as a stand-alone unit, it is understood that a programming recorder may be incorporated into a device (such as a set-top box and/or a television) without departing from the scope of the present disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method, comprising:

receiving at least two programming event recording requests for at least two programming events at a programming recorder, wherein the at least two programming event recording requests each include a request to record a programming event via a first communication path;

receiving first information regarding the at least two programming events at the programming recorder, the first information comprising broadcast schedule data for a broadcast of each of the at least two programming events via the first communication path;

determining that a conflict does not exist between the at least two programming events based on the first information utilizing the programming recorder by executing software;

scheduling the at least two programming events to record via the first communication path in accordance with the at least two programming event recording requests by the programming recorder;

receiving second information regarding the at least two programming events at the programming recorder after scheduling the at least two programming events to record at the programming recorder, wherein the second information regarding the programming events is received prior to the commencement of such at least two programming events, and wherein the second information comprises updated broadcast schedule data for the broadcast of each of the at least two programming events via the first communication path;

detecting that a conflict exists between the at least two programming event recording requests, utilizing the programming recorder by executing software, based on the received second information;

creating a ranked list of alternative sources, utilizing the programming recorder by executing software, for at least a first programming event recording request of the at least two programming event recording requests, and wherein the alternative sources comprise an alternative time to record the programming event via the first communication path or an alternative communication path to record the programming event; and resolving the conflict, utilizing the programming recorder by executing software, by fulfilling the first programming event recording request utilizing an alternative source from the ranked list of alternative sources.

2. The method of claim 1, wherein the at least two programming event recording requests each include a request to record a programming event via the first communication path, wherein the first communication path is selected from the group consisting of: a satellite communication path, a cable communication path, an free-to-air communication path, a terrestrial television communication path, a network communication path, a radio communication path, a cellular communication path, and an Internet communication path.

3. The method of claim 1, wherein the alternative communication path comprises at least one of a satellite communication path, a cable communication path, an free-to-air communication path, a terrestrial television communication path, a network communication path, a radio communication path, a cellular communication path, and an Internet communication path.

4. The method of claim 1, wherein said resolving the conflict by fulfilling at least one of the at least two programming event recording requests utilizing an alternative source comprises:
displaying the ranked list of alternative sources for the first programming event recording request of the at least two programming event recording requests; and
receiving a selection indicating the alternative source to utilize.

5. The method of claim 1, further comprising:
determining no alternative sources exist for the first programming event recording request of the at least two programming event recording requests; and
creating a ranked list of alternative sources for a second programming event recording request of the at least two programming event recording requests.

6. The method of claim 1, wherein said creating a ranked list of alternative sources for a first programming event recording request of the at least two programming event recording requests comprises:
determining alternative sources for the first programming event recording request of the at least two programming event recording requests utilizing available programming event information.

7. The method of claim 6, wherein said determining alternative sources for the first programming event recording request of the at least two programming event recording requests utilizing available programming event information comprises:
determining alternative sources for the first programming event recording request of the at least two programming event recording by analyzing received programming event information.

8. The method of claim 7, wherein said determining alternative sources for the first programming event recording request of the at least two programming event recording by analyzing received programming event information comprises:
comparing metadata included in the first programming event recording request with metadata included in the received programming event information.

9. The method of claim 8, wherein the metadata includes a content reference identifier.

10. The method of claim 6, wherein said determining alternative sources for the first programming event recording request of the at least two programming event recording requests utilizing available programming event information comprises:
determining alternative sources for the first programming event recording request of the at least two programming event recording by querying a programming event information database.

11. The method of claim 10, wherein said determining alternative sources for the first programming event recording request of the at least two programming event recording by querying a programming event information database comprises:
comparing metadata included in the first programming event recording request with metadata included in the programming event information database.

12. The method of claim 11, wherein the metadata includes a content reference identifier.

13. The method of claim 1, wherein said detecting a conflict between the at least two programming event recording requests based on the received second information comprises determining the at least two programming event recording requests overlap in time on the first communication path.

14. The method of claim 1, wherein said resolving the conflict by fulfilling at least one of the at least two programming event recording requests utilizing an alternative source comprises:
fulfilling at least one of the at least two programming event recording requests by downloading a programming event via Internet.

15. The method of claim 1, wherein said creating a ranked list of alternative sources for a first programming event recording request of the at least two programming event recording requests comprises:
receiving priority information indicating how alternative sources are to be ranked; and
ordering the ranked list of alternative sources for the first programming event recording request of the at least two programming event recording requests according to the priority information.

16. The method of claim 1, further comprising:
displaying an indication that the conflict between the at least two programming event recording requests was detected and resolved.

* * * * *